United States Patent
Miyauchi et al.

(10) Patent No.: US 6,272,225 B1
(45) Date of Patent: Aug. 7, 2001

(54) KEY RECOVERY CONDITION ENCRYPTION AND DECRYPTION APPARATUSES

(75) Inventors: Hiroshi Miyauchi; Kazue Sako; Masashi Yamazaki, all of Tokyo; Seiichi Domyo, Kanagawa; Hiroyoshi Tsuchiya, Kanagawa; Seiko Kanno, Kanagawa; Ichirou Morita, Kanagawa; Naoya Torii, Kanagawa; Hiroyuki Ando, Kanagawa; Yasutsugu Kuroda, Kanagawa, all of (JP)

(73) Assignees: NEC Corporation, Tokyo (JP); Hitachi Limited, Tokyo (JP); Fujitsu Limited, Kanagawa (JP)

( * ) Notice: Subject to any disclaimer, the term of this patent is extended or adjusted under 35 U.S.C. 154(b) by 0 days.

(21) Appl. No.: 09/110,392

(22) Filed: Jul. 7, 1998

(30) Foreign Application Priority Data

Jul. 7, 1997 (JP) .................................................. 9-181593

(51) Int. Cl.[7] ...................................................... H04L 9/32
(52) U.S. Cl. ........................... 380/286; 380/281; 380/284; 380/286; 380/268; 380/46
(58) Field of Search .............................. 380/46, 268, 286, 380/284, 281

(56) References Cited

U.S. PATENT DOCUMENTS

| 5,201,000 | * | 4/1993 | Matayas et al. | 380/30 |
| 5,557,765 | * | 9/1996 | Lipner et al. | 380/21 |
| 5,631,961 | * | 5/1997 | Mills et al. | 380/21 |
| 6,058,188 | * | 5/2000 | Chandersekaran et al. | 380/25 |

OTHER PUBLICATIONS

"File Encryption System Using Public Key Cryptography", 47th Proceedings of the Information Processing Society of Japan, Oct. 1993, pp. 4–197–4–198.

* cited by examiner

Primary Examiner—Thomas R. Peeso
Assistant Examiner—Todd Jack
(74) Attorney, Agent, or Firm—Sughrue, Mion, Zinn, Macpeak & Seas, PLLC

(57) ABSTRACT

A key recovery condition encryption apparatus includes a hashing unit, a first concatenating unit, and a condition information encryption unit. The hashing unit calculates a hash value on the basis of a hash function using a key recovery information text serving as information necessary for performing key recovery. The first concatenating unit concatenates the hash value from the hashing unit to the key recovery condition. The condition information encryption unit encrypts a concatenating result from the first concatenating unit by using a first encryption key. Also is disclosed a key recovery condition decryption apparatus for decrypting the encrypted data from the above encryption apparatus.

26 Claims, 4 Drawing Sheets

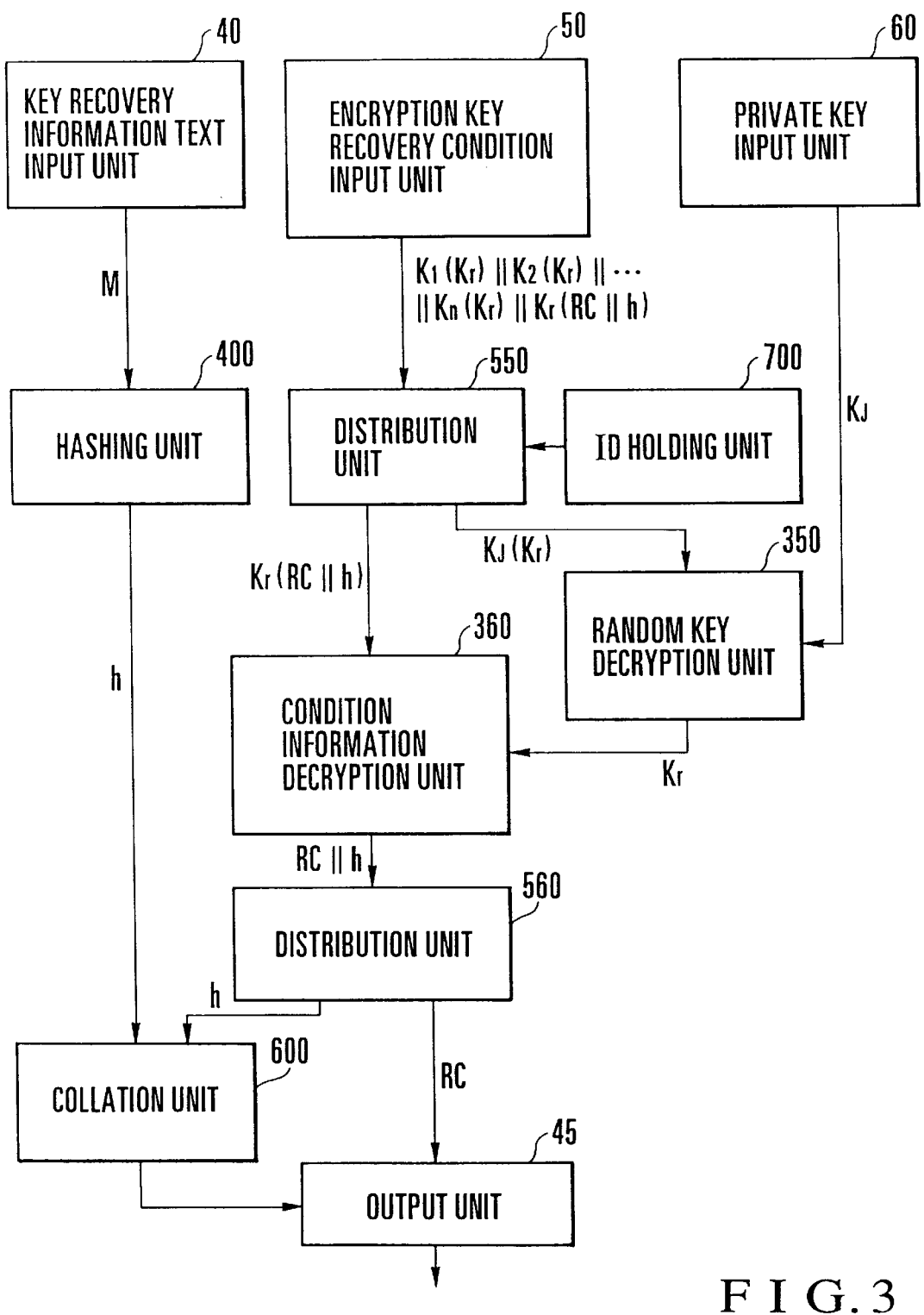
F I G. 3

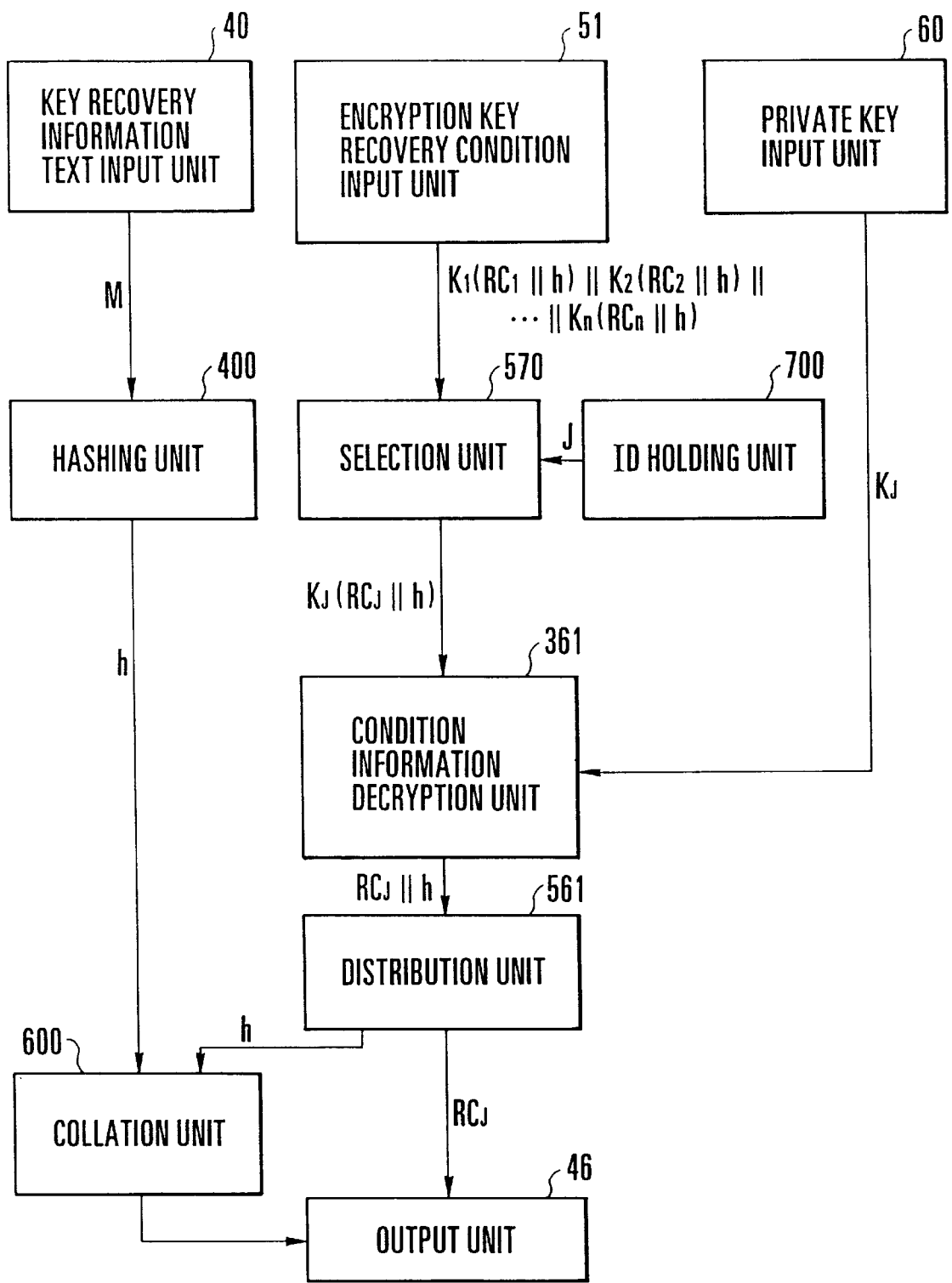
F I G. 4

KEY RECOVERY CONDITION ENCRYPTION AND DECRYPTION APPARATUSES

BACKGROUND OF THE INVENTION

The present invention relates to key recovery condition encryption and decryption apparatuses and, more particularly, to key recovery condition encryption and decryption apparatuses for adding an encryption key used for encryption to protect data privacy and recovering the encrypted data.

In general, to encrypt and store data, a decryption key is required to decrypt the encrypted data. It is, however, impossible for an authentic user to decrypt the encrypted data if he loses the decryption key. A key recovery technique is known as the state-of-the-art technique for solving this problem. In a key recovery technique of this type, key information is added (appended) to the encrypted data, and the decryption key is recovered from the key information using secret information of a third-party organization.

In the key recovery technique, the key recovery condition must be set. More specifically, even if a person who illicitly acquired encrypted data by some method presents the encrypted data to the third-party organization, decryption of the illicitly acquired encrypted data must be prevented. There is therefore provided a method of adding, to key information, a key recovery condition, i.e., a condition to determine whether a person who requests key recovery has the authentic right of key recovery.

A method of encrypting a user name and adding the encrypted user name to key information is proposed as a conventional method of determining the presence or absence of the right of key recovery using such a key recovery condition, as described in File Encryption System Using Public Key Cryptography, Proceedings of the Information Processing Society of Japan, 47th, October 1993, 4-197.

U.S. Pat. No. 5,557,765 proposes a method of registering a key recovery condition in a third-party organization in advance, combining an issued registration number and an encryption key, and encrypting the combination using a public key of the third-party organization.

There is also provided still another method of causing a plurality of third-party organizations to determine the right of key recovery, and recovering the key only when all the third-party organizations admit the authentic right of key recovery. According to this method, as described in WO93/21708, data decryption key information is divided into pieces in advance, the third-party organizations obtain parts of the data decryption key from the divided pieces, and these divided pieces are collected and concatenated to allow recovery of the data decryption key.

The conventional key recovery techniques described above have the following drawbacks. According to the method of encrypting the user name and adding the encrypted user name to the key information, only the authentic user can decrypt the encrypted data. It is actually impossible to assign an agent to decrypt the encrypted data when the authentic user is absent or dead. In addition, the third party can relatively easily access the key recovery condition because the user name is used.

According to the method of registering the key recovery condition, every time a new key recovery condition is set, it must be registered in the third-party organization. The procedures including authentication in registration become cumbersome. The key recovery condition is not added to the key information.

SUMMARY OF THE INVENTION

It is an object of the present invention to provide key recovery condition encryption and decryption apparatuses capable of adding a key recovery condition having relatively complex contents to key information without registering the key recovery condition in a third-party organization.

In order to achieve the above object of the present invention, there is provided a key recovery condition encryption apparatus for encrypting a key recovery condition which determines recovery permission of a decryption key used in decrypting an encrypted message, and for adding the decrypted key recovery condition to key information, comprising hashing means for calculating a hash value on the basis of a hash function using a key recovery information text serving as information necessary for performing key recovery, first concatenating means for concatenating the hash value from the hashing means to the key recovery condition, and condition information encryption means for encrypting a concatenating result from the first concatenating means by using a first encryption key.

BRIEF DESCRIPTION OF THE DRAWINGS

FIG. 3 is a block diagram of a key recovery condition decryption apparatus according to the third embodiment of the present invention; and FIG. 4 is a block diagram of a key recovery condition decryption apparatus according to the fourth embodiment of the present invention.

DESCRIPTION OF THE PREFERRED EMBODIMENTS

Figure 1:
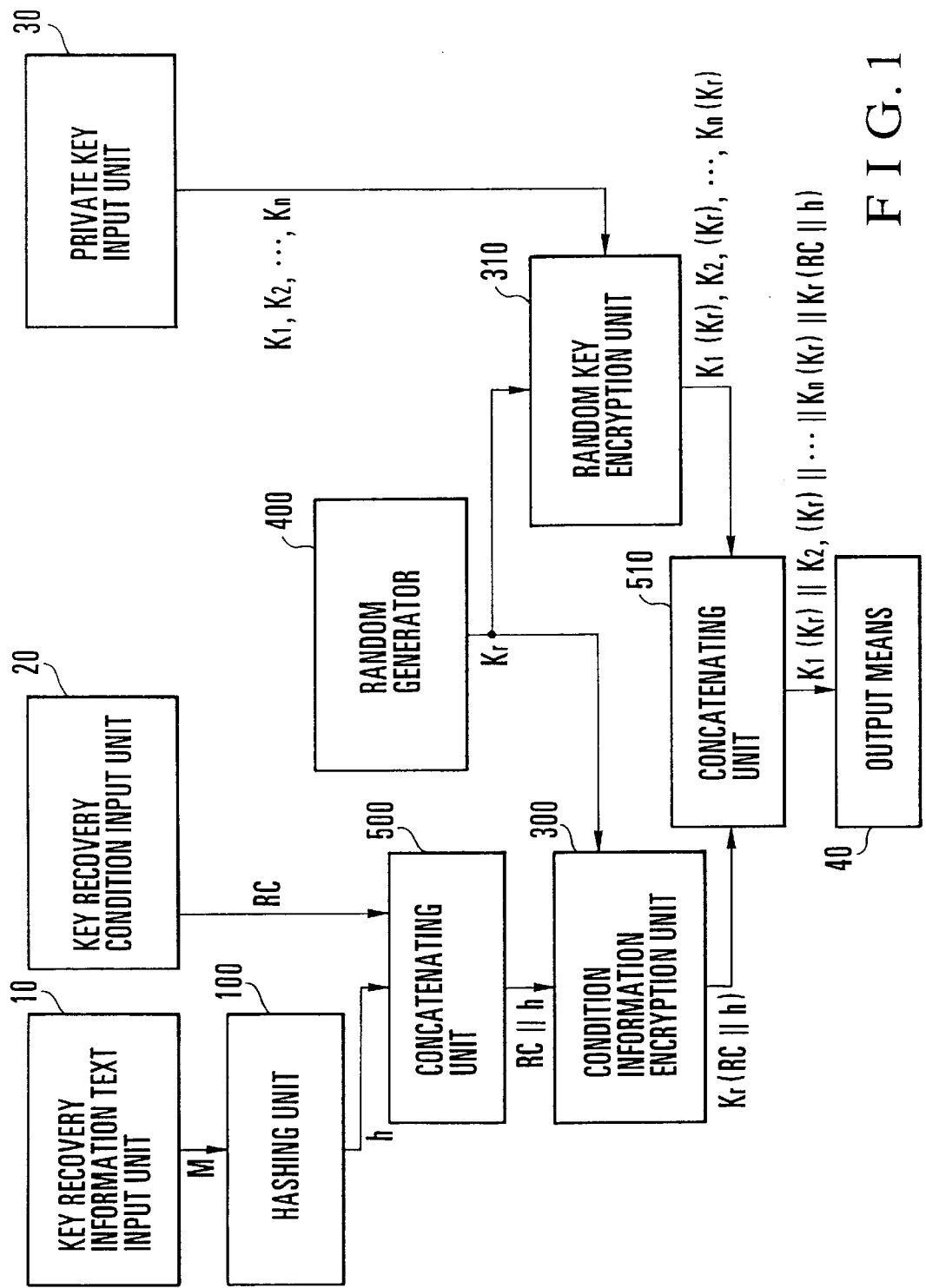
FIG. 1 is a block diagram of a key recovery condition encryption apparatus according to the first embodiment of the present invention.

The present invention will be described in detail with reference to the accompanying drawings.

The principle of key recovery according to the present invention will be described below. In the following description, data x encrypted with a key K is described as K(x). A data concatenation is expressed as "∥". For example, x1∥x2 represents that the data x1 and x2 are concatenated. The data concatenation may be a pseudo-concatenation in which data are sequentially arranged. Data may be synthesized by any method if the synthetic data can be divided later on.

According to the present invention, a hash function is used. The hash function receives data having an arbitrary length and outputs data having a fixed length (e.g., 160 bits). In general, the hash function used in the field of information security has the following nature.

I) Each output bit is influenced by all input bits.

II) It is difficult to create a plurality of input data for producing the same output.

The hash function will be referred to as hash( ) hereinafter.

According to the present invention, a plurality of third-party organizations can recover a key. The respective third-party organizations play any of the following roles: the third-party organizations cooperate to recover the key; any third-party organization can recover the key; and some third-party organizations in a preset combination can recover the key.

Information for allowing a third-party organization to recover a key is called a "key recovery information text", which is represented by M. Each third-party organization can extract information necessary for key recovery from the key recovery information text M. The key recovery information text M contains information for acquiring a key recovery condition. The ith third-party organization is defined as Ei, and information for acquiring the key recovery condition extracted from the key recovery information text M by the third-party organization Ei is defined as Ki.

The present invention uses the following two formats for adding the key recovery condition.

The first format is given as:

$$K1(Kr)\|K2(Kr)\| \ldots \|Kn(Kr)\|Kr(RC\|hash(M))$$

where RC is the key recovery condition, and Kr is the key (random key) generated by a random number for encrypting the key recovery condition.

Each third-party organization Ei uses the key Ki recovered by itself from the key recovery information text M to decrypt a random key Kr and hash(M). The key recovery condition RC can be decrypted using the decrypted key Kr. In addition, hash(M) is generated from the key recovery information text M and is collated with hash(M) decrypted from the key recovery condition RC, thereby confirming correct correspondence between the key recovery information text M and the additional information.

Others except the third-party organizations E1, E2, . . . , En cannot access any one of the keys K1, K2, . . . , Kn, and cannot decrypt the key Kr or the key recovery condition RC, or cannot generate additional information in which different key recovery conditions are embedded.

The second format used as one of the formats for adding the key recovery condition RC used in the present invention is given as follows:

$$K1(RC1\|hash(M))\|K2(RC2\|hash(M))\| \ldots \|(Kn(RCn\|hash(M))$$

Using the second format, each third-party organization can decrypt RCi and hash(M), but others cannot decrypt or alter them, as in the first format.

According to the characteristic feature of the second format, each third-party organization Ei can describe the unique condition RCi in decryption. As described above, the second format can describe more complicated condition than that of the first format, but has a large description quantity.

A method of safely adding a key recovery condition using these two description methods will be described below.

FIG. 1 shows a key recovery condition encryption apparatus according to the first embodiment of the present invention. A case in which a key recovery condition is added using the first format as the format for adding a key recovery condition will be described below.

Referring to FIG. 1, a key recovery information text input unit 10 receives a key recovery information text M and outputs it to a hashing unit 100. A key recovery condition input unit 20 receives a key recovery condition RC and outputs it to a concatenating unit 500. A private key input unit 30 receives a Ki sequence of KI, K2, . . . , Kn extracted from the key recovery information text M by the respective third-party organizations and outputs it to a random key encryption unit 310. The hashing unit 100 receives the key recovery information text M from the key recovery information text input unit 10, generates a hash value h using the predetermined hash function h=hash(M), and outputs the generated hash value h to the concatenating unit 500.

The concatenating unit 500 concatenates the key recovery condition RC from the key recovery condition input unit 20 and the hash value h from the hashing unit 100 and output a concatenating result RC∥h to a condition information encryption unit 300. A random generator 400 generates a random key Kr using a random number and outputs it to the condition information encryption unit 300 and the random key encryption unit 310.

The condition information encryption unit 300 encrypts the concatenating result RC∥h from the concatenating unit 500 using the random key Kr from the random generator 400 and outputs an encryption result Kr(RC∥h) to a concatenating unit 510. The random key encryption unit 310 encrypts the random key Kr from the random generator by using the Ki sequence of K1, K2, . . . , Kn as keys from the private key input unit 30, thereby outputting K1(Kr)∥K2(Kr)∥ . . . ∥Kn(Kr)∥Kn(RC∥h) to the concatenating unit 510.

The concatenating unit 510 concatenates the encryption results from the condition information encryption unit 300 and the random key encryption unit 310 and outputs the concatenating result to an output unit 40. The output unit 40 receives the concatenating result from the concatenating unit 510 and outputs it.

As described above, by using the first format as the format for adding a key recovery condition, the encryption result of the key recovery information text M to which the key recovery condition RC is added is obtained.

Figure 2:
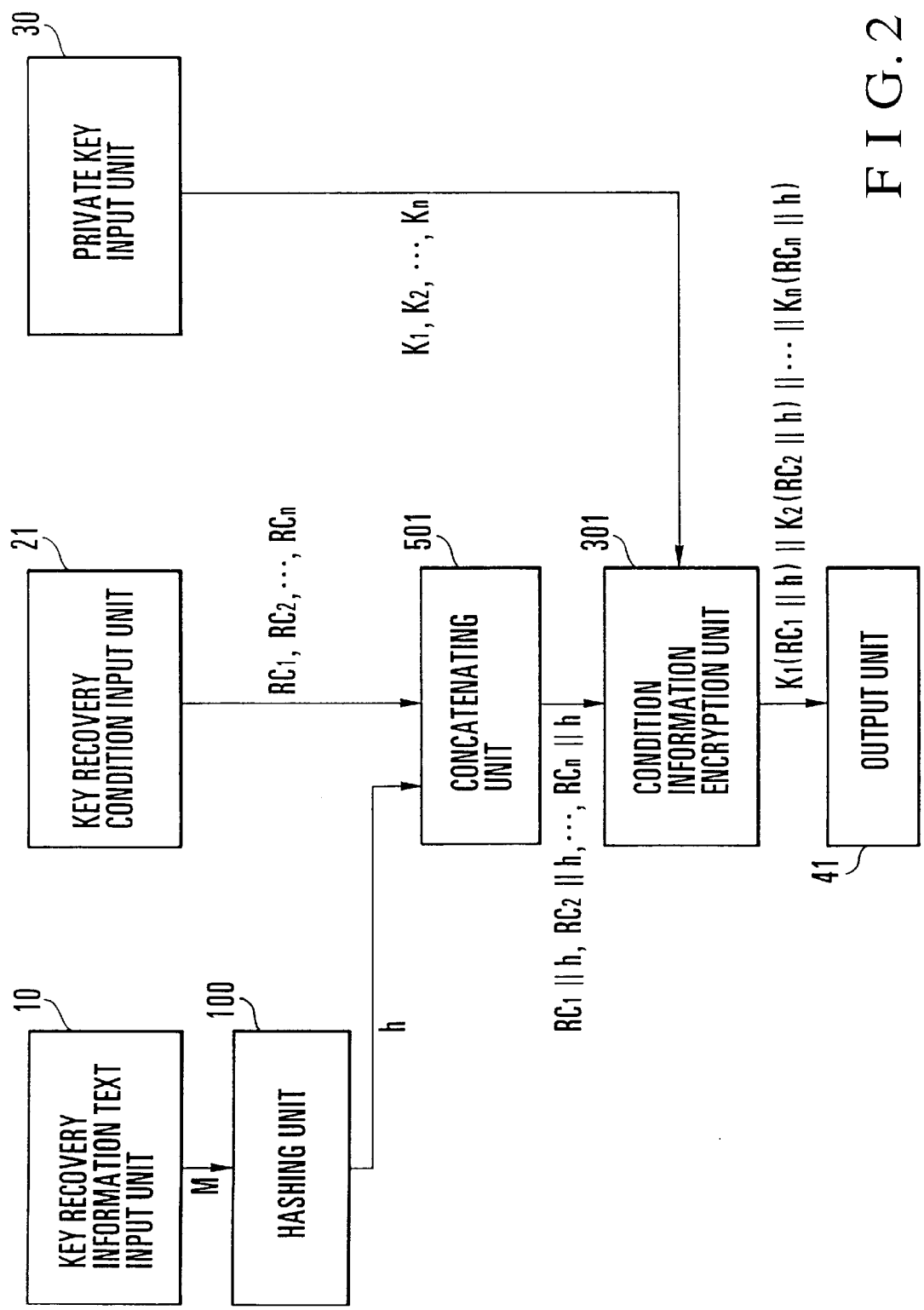
FIG. 2 is a block diagram of a key recovery condition encryption apparatus according to the second embodiment of the present invention.

FIG. 2 shows a key recovery condition encryption apparatus according to the second embodiment of the present invention. A case in which a key recovery condition is added using the second format as the format for adding a key recovery condition will be described below. The same reference numerals as in the first embodiment denote the same parts in the second embodiment.

Referring to FIG. 2, a key recovery information text input unit 10 receives a key recovery information text M and outputs it to a hashing unit 100. A key recovery condition input unit 21 receives a key recovery condition sequence of RC1, RC2, . . . , RCn and outputs it to a concatenating unit 501.

A private key input unit 30 receives the Ki sequence of K1, K2, . . . , Kn extracted from the key recovery information text M by the respective third-party organizations and outputs it to a condition information encryption unit 301. The hashing unit 100 receives the key recovery information text M from the key recovery information text input unit 10, generates a hash value h using the preset hash function h=hash(M), and outputs the generated hash value h to the concatenating unit 501.

The concatenating unit 501 concatenates the hash value h from the hashing unit 100 to the key recovery condition sequence of RC1, RC2, . . . , RCn from the key recovery condition input unit 21 to generate RC1∥h, RC2∥h, . . . , RCn∥h, and outputs them to the condition information encryption unit 301.

The condition information encryption unit 301 encrypts the concatenating results RC1∥h, RC2∥h, . . . , RCn∥h from the concatenating unit 501 respectively using the private key sequence of K1, K2, . . . , Kn from the private key input unit 30 to generate an encryption result K1(RC1∥h)∥K2(RC2∥h)∥ . . . ∥Kn(RCn∥h), and outputs it to an output unit 41. The output unit 41 receives the encryption result from the condition information encryption unit 301 and outputs it.

As described above, by using the second format as the format for adding a key recovery condition, the encryption result of the key recovery information text M added with the key recovery condition sequence of RC1, RC2, . . . , RCn can be obtained.

FIG. 3 shows a key recovery condition decryption apparatus according to the third embodiment of the present invention. A case will be described in which a key recovery condition added using the first format as the format for adding a key recovery condition is decrypted, and the decrypted condition is collated with a key recovery information text.

Referring to FIG. 3, a key recovery information text input unit 40 receives a key recovery information text M from the encryption apparatus shown in FIG. 1 and outputs it to a hashing unit 400. An encryption key recovery condition input unit 50 receives an encryption key recovery condition added to the key recovery information text M and outputs it to a distribution unit 550. A private key input unit 60 receives private keys Kj extracted from the key recovery information text M by the corresponding third-party organizations Ej and outputs them to a random key decryption unit 350.

The hashing unit 400 receives the key recovery information text M from the key recovery information input unit 40, generates a hash value h using a preset hash function h=hash(M), and outputs the generated hash value to a collation unit 600. An ID holding unit 700 holds the IDs of the corresponding third-party organizations and outputs them to the distribution unit 550. The distribution unit 550 outputs Kr(RC||h) to a condition information decryption unit 360 and a random key Kj(Kr) to the random key decryption unit 350 on the basis of the additional information K1(Kr), K2(Kr), . . . , Kn(Kr) from the decryption key recovery condition input unit 50 and the IDs j of the corresponding third-party organizations from the ID holding unit 700.

Using the private keys Kj from the private key input unit 60, the random key decryption unit 350 decrypts the random keys Kj(Kr) encrypted for the corresponding third-party organizations from the distribution unit 550, thereby generating the random key Kr, which is then output to the condition information decryption unit 360.

The condition information decryption unit 360 decrypts Kr(RC||h) from the distribution unit 550 by using the random key Kr from the random key decryption unit 350 to generate a decryption result RC||h, and outputs it to a distribution unit 560. The distribution unit 560 divides the decryption result RC||h from the condition information decryption unit 360 to output a hash value h to the collation unit 600 and a key recovery condition RC to an output unit 45.

The collation unit 600 collates whether the two hash values h from the hashing unit 100 and the distribution unit 560 coincide with each other. The collation unit 600 outputs a collation result to the output unit 45. The output unit 45 outputs the key recovery condition RC from the distribution unit 560 when the collation result from the collation unit 600 represents the "coincidence"; otherwise, an error is output.

As described above, the key recovery condition added using the first format serving as the format for adding the key recovery condition is decrypted, and the decryption result obtained using this key recovery condition RC is collated with the key recovery information text M. When the output unit 45 outputs the key recovery condition RC on the basis of the collation result, the third-party organization confirms the coincidence between the key recovery condition from the output unit 45 and the key recovery condition based on the statement of the key recovery requester and decrypts the encrypted message.

FIG. 4 shows a key recovery condition decryption apparatus according to the fourth embodiment of the present invention. A case will be described in which a key recovery condition added using the second format as a format for adding a key recovery condition in a third-party organization Ej is decrypted, and the decrypted condition is collated with the key recovery information text. The same reference numerals as in FIG. 3 denote the same parts in FIG. 4.

Referring to FIG. 4, a key recovery information text input unit 10 receives a key recovery information text M from the encryption apparatus shown in FIG. 2 and outputs it to a hashing unit 100. An encryption key recovery condition input unit 51 receives the encryption key recovery condition added to the key recovery information text M and outputs it to a selection unit 570. A private key input unit 60 receives a private key Kj extracted from the key recovery information text M by the third-party organization Ej and outputs it to a condition information decryption unit 361.

The hashing unit 100 receives the key recovery information text M from the key recovery information text input unit 10, generates a hash value h using a preset hash function h=hash(M), and outputs the hash value h to a collation unit 600. An ID holding unit 700 holds the ID of the third-party organization and outputs it to the selection unit 570. The selection unit 570 outputs Kj(RC||h) to the condition information decryption unit 361 on the basis of K1(RC1||h), K2(RC2||h), . . . Kn(RCn||h) from the encryption key recovery condition input unit 51 and the values j as the IDs of the corresponding third-party organizations from the ID holding unit 700.

The condition information decryption unit 361 decrypts Kj(RCj||h) from the selection unit 570, using the private key Kj from the private key input unit 60, thereby generating a decryption result RCj||h and outputting it to a distribution unit 561.

The distribution unit 561 divides RCj||h from the condition information decryption unit 361 to output the hash value h to the collation unit 600 and a key recovery condition RCj to an output unit 46. The collation unit 600 collates whether the two hash values h from the hashing unit 100 and the distribution unit 561 coincide with each other. The collation unit 600 outputs the collation result to the output unit 46.

When the collation result from the collation unit 600 represents the "coincidence", the output unit 46 outputs the key recovery condition RCj from the distribution unit 561; otherwise, an error is output.

The key recovery condition added using the second format serving as the format for adding the key recovery condition is decrypted, and the key recovery information text M is collated with the decryption result obtained using the key recovery condition RCj.

As has been described above, according to the present invention, as compared with the conventional technique for adding the encrypted user name to the key information, encrypted data can be decrypted by a person except the authentic user, and a relatively complex key recovery condition can be efficiently described.

A key recovery condition need not be registered in a third-party organization, the cumbersome registration procedure can be omitted, and the load on the user can be greatly reduced.

The key recovery condition of complex contents can be efficiently described for cases including cooperative key recovery by a plurality of third-party organizations, and illicit activities such as alteration of the key recovery condition can be reliably prevented.

What is claimed is:

1. A key recovery condition encryption apparatus for encrypting a key recovery condition which determines recovery permission of a decryption key used in decrypting an encrypted message, and for adding the decrypted key recovery condition to key information, comprising:

a hashing device that calculates a hash value on the basis of a hash function using a key recovery information text serving as information necessary for performing key recovery;

a first concatenator that concatenates the hash value from said hashing device to the key recovery condition; and a condition information encryptor that encrypts a concatenating result from said first concatenator by using a first encryption key.

2. An apparatus according to claim 1, wherein said apparatus further comprises:

a random generator that generates an arbitrary random key serving as the first encryption key;

a random key encryptor that encrypts the random key from said random generator by using a private key serving as a second encryption key;

a second concatenator that concatenates an encryption result from said condition information encryptor to an encryption result from said random key encryptor; and said condition information encryptor encrypts the concatenating result from said first concatenator by using the random key from said random generator.

3. An apparatus according to claim 2, further comprising:

a first input that receives the key recovery information text and outputs the received key recovery information text to said hashing device;

a second input that receives the key recovery condition and outputs the key recovery condition to said first concatenator; and a third input that receives the private key and outputs the private key to said random key encryptor.

4. An apparatus according to claim 1, wherein said condition information encryptor encrypts the concatenating result from said first concatenator by using the private key serving as the first encryption key.

5. An apparatus according to claim 4, further comprising:

a first input that receives the key recovery information text and outputs the received key recovery information text to said hashing device;

a second input that receives the key recovery condition and outputs the key recovery condition to said first concatenator; and a third input that receives the private key and outputs the private key to said condition information encryptor.

6. A key recovery condition decryption apparatus for decrypting, using an encrypted key recovery condition, a key recovery condition for determining recovery permission of a decryption key used in decrypting an encrypted message, comprising:

a hashing device that calculates a hash value on the basis of a predetermined hash function using a key recovery information text serving as information necessary for performing key recovery;

an extractor that extracts at least condition information containing the key recovery condition from an encrypted key recovery condition added to the key recovery information text, on the basis of a private key serving as a first decryption key;

a condition information decryptor that decrypts concatenating information of the key recovery condition and the hash value from the condition information from said extractor by using a second decryption key containing a private key; and a first distributor that distributes the concatenating information from said condition information encryption device into a key recovery condition and a hash value.

7. An apparatus according to claim 6, further comprising a collator that collates the hash value from said hashing device with the hash value from said first distributor and determines on the basis of a collation result whether the key recovery condition from said first distributor is correct.

8. An apparatus according to claim 6, wherein said apparatus further comprises:

a second distributor constituting said extractor, that distributes an encryption key recovery condition added to the key recovery information text into condition information containing the key recovery condition and random key information containing a random key that decrypts the condition information, on the basis of identification information corresponding to a private key; and a random key decryptor that decrypts the random key serving as the second decryption key by using the private key from the random key information from said second distributor; and said condition information decryptor decrypts concatenating information of the key recovery condition and the hash value from the condition information from said second distributor by using the random key from said random key decryptor.

9. An apparatus according to claim 8, further comprising:

a first input that receives the key recovery information text and outputs the received key recovery information text to said hashing device;

a second input that receives the key recovery condition and outputs the key recovery condition to said second distributor; and a third input that receives the private key and outputs the private key to said random key decryptor.

10. An apparatus according to claim 6, further comprising a selector constituting said extractor, that selects the condition information containing the key recovery condition from the encrypted key recovery condition added to the key recovery information text, on the basis of identification information corresponding to the private key and outputting selected information to said condition information decryptor.

11. An apparatus according to claim 10, further comprising:

a first input that receives the key recovery information text and outputs the received key recovery information text to said hashing device;

a second input that receives the key recovery condition and outputs the key recovery condition to said selector; and a third input that receives the private key and outputs the private key to said condition information decryptor.

12. A key recovery condition encryption apparatus for encrypting a key recovery condition which determines recovery permission of a decryption key used in decrypting an encrypted message, and for adding the decrypted key recovery condition to key information, comprising:

a hashing device that calculates a hash value on the basis of a hash function using a key recovery information text serving as information necessary for performing key recovery;

a first concatenator that concatenates the hash value from said hashing device to the key recovery condition;

a random generator that generates an arbitrary random key;

a condition information encryptor that encrypts a concatenating result from said first concatenator by using a random key from said random generator;

a random key encyptor that encrypts the random key from said random generator by using only a predetermined private key; and a second concatenator that links an encryption result from said condition information encryptor to an encryption result from said random key encryptor.

13. A key recovery condition decryption apparatus for decrypting, using an encrypted key recovery condition, a key recovery condition for determining recovery permission of a decryption key used in decrypting an encrypted message, comprising:

a hashing device that calculates a hash value on the basis of a predetermined hash function using a key recovery information text serving as information necessary for performing key recovery;

a first distributor that distributes an encrypted key recovery condition added to the key recovery information text into condition information containing the key recovery condition and random key information containing a random key for decrypting the condition information, on the basis of identification information corresponding to the predetermined private key;

a random key decryptor that decrypts the random key contained in the random information from said first distributor by using the private key;

a condition information decryptor that decrypts concatenating information of the key recovery condition and the hash value from the condition information from said first distributor by using the random key from said random key decryptor;

a second distributor that distributes the concatenating information from said condition information decryptor into a key recovery condition and a hash value; and a collator that collates the hash value from said hashing device with the hash value from said second distributor and determines on the basis of a collation result whether the key recovery condition from said second distributor is correct.

14. The apparatus of claim 12, further comprising:

a first input that receives said key recovery information text and outputs said key recovery information text to said hashing device;

a second input that receives said key recovery condition and outputs said key recovery condition to said first concatenator; and a third input that receives said private key and outputs said private key to said random key encryptor.

15. The apparatus of claim 13, further comprising:

a first input that receives said key recovery information text and outputs said key recovery information text to said hashing device;

a second input that receives said key recovery condition and outputs said key recovery condition to said second distributor; and a third input that receives said private key and outputs said private key to said random key decryptor.

16. A method of key recovery encryption and decryption, comprising the steps of:

encrypting a key recovery condition, comprising,
hashing key recovery information to generate a first hash value,
first concatenating said first hash value with a key recovery condition to generate a first concatenated output,
encrypting said first concatenated output in accordance with a random key to generate a first encrypted output,
encrypting said random key in accordance with a private key to generate a second encrypted output, and
second concatenating said first encrypted output and said second encrypted output to generate an encrypted key recovery condition; and decrypting said encrypted key recovery condition, comprising,
hashing said key recovery information to generate a second hash value,
distributing said encrypted key recovery condition and said encrypted random key from said encrypted key recovery condition in accordance with a third party identification value,
(a) decrypting said encrypted random key in accordance with said private key input to generate said random key,
(b) decrypting said encrypted key recovery condition in accordance with said random key to generate said first concatenated output, and
dividing said first concatenated output to generate a third hash value and outputting said key recovery condition when said second hash value equals said third hash value.

17. A method of key recovery encryption and decryption, comprising the steps of:

encrypting a key recovery condition using only a private key; and decrypting a key recovery condition by a person except an authentic user, wherein said key recovery condition need not be registered in a third party organization, and said encrypting said key recovery condition comprises,
first concatenating a first hash value that comprises key recovery information with a key recovery condition to generate a first concatenated output,
encrypting said first concatenated output in accordance with a random key to generate a first encrypted output,
encrypting said random key in accordance with a private key to generate a second encrypted output, and
second concatenating said first encrypted output and said second encrypted output to generate an encrypted key recovery condition.

18. The method of claim 17, said decrypting said encrypted key recovery condition comprising:

distributing said encrypted key recovery condition and said encrypted random key from said encrypted key recovery condition in accordance with a third party identification value;

decrypting said encrypted key recovery condition in accordance with said random key, decrypted in accordance with said private key, to generate said first concatenated output; and dividing said first concatenated output to generate a third hash value and outputting said key recovery condition when a second hash comprising said key recovery information value equals said third hash value.

19. A method of key recovery encryption and decryption, comprising the steps of:

encrypting a key recovery condition, comprising,
hashing key recovery information to generate a first hash value,
concatenating said first hash value with a plurality of key recovery conditions to generate a concatenated output, and encrypting said first concatenated output in accordance with a private key to generate an encrypted key recovery condition; and decrypting said encrypted key recovery condition, comprising,
hashing said key recovery information to generate a second hash value;
selecting said encrypted key recovery condition in accordance with a third party identification value;
decrypting said encrypted key recovery condition in accordance with said private key to generate said first concatenated output;
dividing said first concatenated output to generate a third hash value and outputting said key recovery condition when said second hash value equals said third hash value.

20. A method of key recovery encryption and decryption, comprising:
encrypting a key recovery condition with only a private key, said encrypting step comprising,
concatenating a first hash value comprising key recovery information with a plurality of key recovery conditions to generate a concatenated output, and
encrypting said concatenated output in accordance with a private key to generate an encrypted key recovery condition; and
decrypting a key recovery condition by a person except an authentic user, wherein said key recovery condition need not be registered in a third party organization and cooperative key recovery can be performed by a plurality of third parties.

21. The method of claim 20, said decrypting said encrypted key recovery condition comprising:
selecting said encryption key recovery condition in accordance with a third party identification value;
decrypting said encrypted key recovery condition in accordance with said private key to generate said concatenated output; and
dividing said concatenated output to generate a third hash value and outputting said key recovery condition when a second hash value that comprises said key recovery information equals said third hash value.

22. A method of key recovery encryption and decryption, comprising the steps of:
encrypting a key recovery condition, comprising,
first concatenating a first hash value that comprises key recovery information with a key recovery set to generate a first concatenated output,
encrypting said first concatenated output in accordance with a control key to generate an encrypted key recovery condition; and
decrypting said encrypted key recovery condition, comprising,
selecting said encrypted key recovery set in accordance with a third party identification value;
decrypting said encrypted key recovery condition in accordance with said control key to generate said first concatenated output;
dividing said first concatenated output to generate a third hash value and output said key recovery set when a second hash value that comprises said key recovery information equals said third hash value.

23. The method of claim 22, wherein said first concatenating step comprise receiving a one of a single key recovery condition and a plurality of key recovery conditions that correspond to a plurality of third parties.

24. The method of claim 22, wherein said encrypting and decrypting steps comprise using a random key in accordance with a private key.

25. The method of claim 22, wherein said encrypting and decrypting steps comprise using a private key without any random key.

26. The method of claim 22, said encrypting said first concatenated output step further comprising:
encrypting a private key in accordance with said control key to generate a second encrypted output, and
second concatenating said first encrypted output and said second encrypted output to generate said encrypted key recovery condition.

* * * * *